H. F. BECHMAN.
ROTARY PRESS (DOUBLE LINE).
APPLICATION FILED MAR. 14, 1910.
Reissued July 12, 1910.
13,129.
2 SHEETS—SHEET 1.
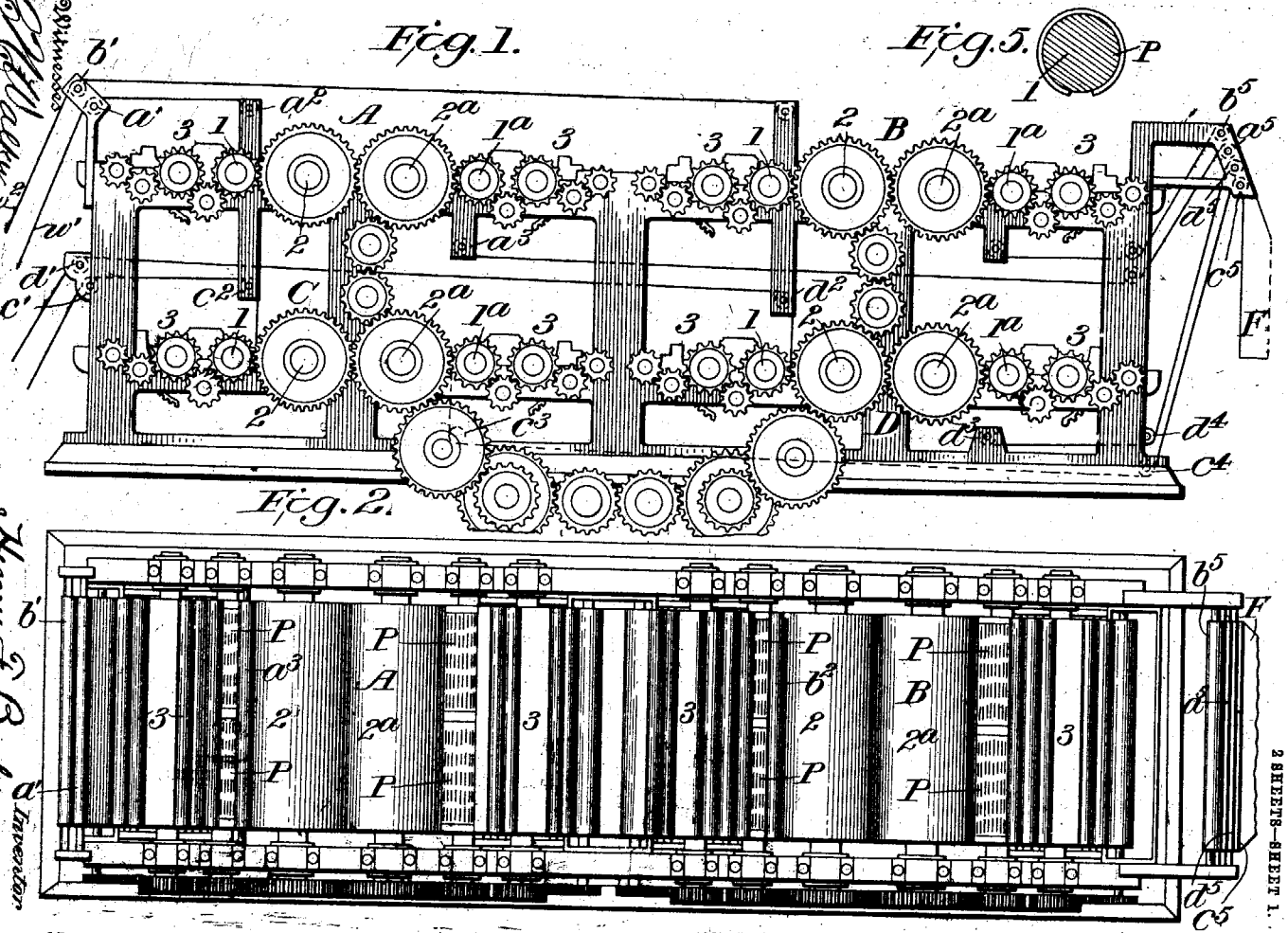
Witnesses
C. H. Walker.
James R. Mansfield
Inventor
By Henry F. Bechman
Alexander F. Dowell
Attorney H. F. BECHMAN.
ROTARY PRESS (DOUBLE LINE).
APPLICATION FILED MAR. 14, 1910.
Reissued July 12, 1910.
13,129.
2 SHEETS—SHEET 2.
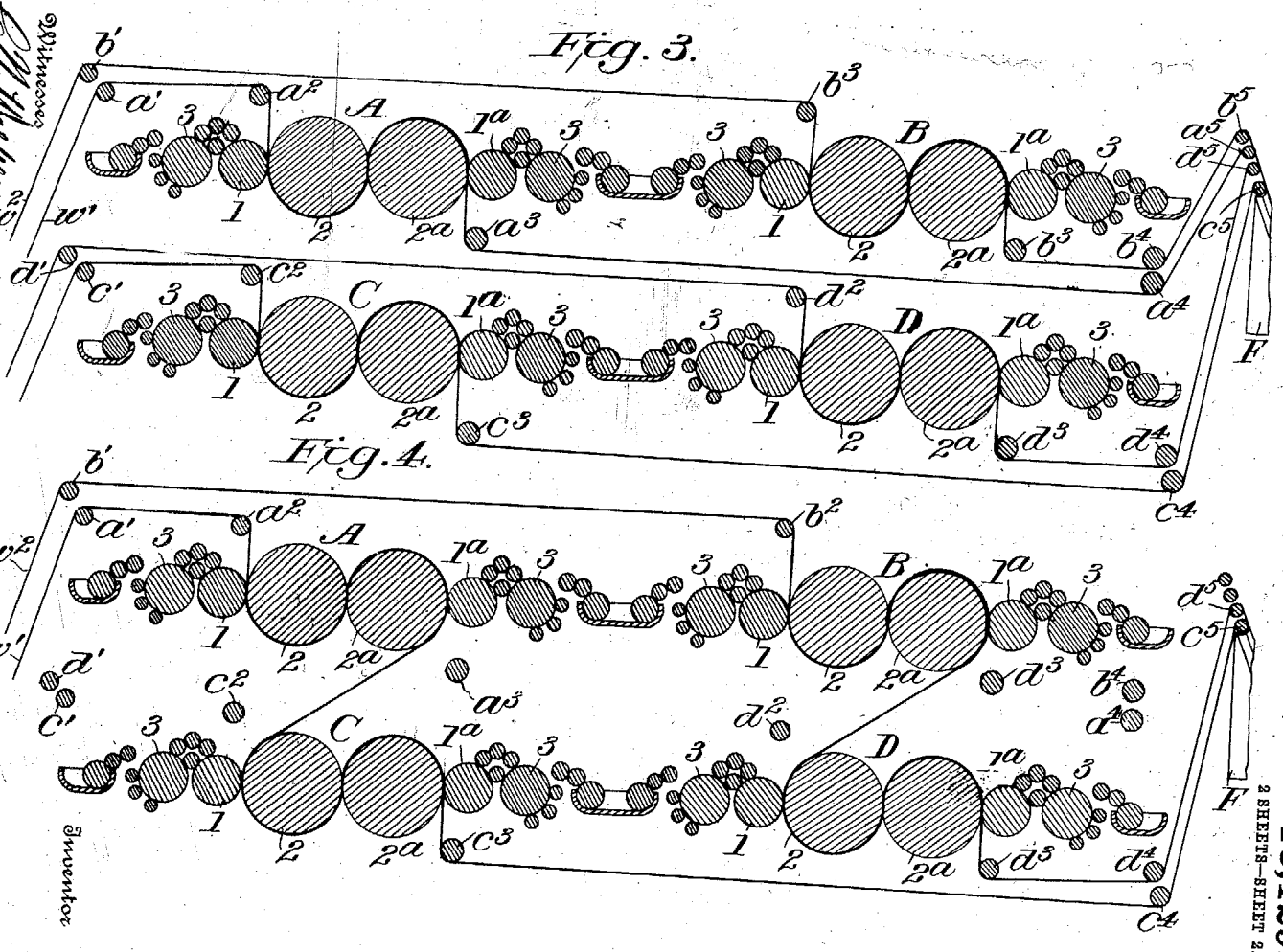
Witnesses
C. M. Walker
James R. Mansfield
Inventor
Henry F. Bechman
By Alexander & Dowell
Attorneys

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN.

ROTARY PRESS, (DOUBLE LINE.)

13,129. Specification of Reissued Letters Patent. Reissued July 12, 1910.

Original No. 867,230, dated October 1, 1907, Serial No. 331,601. Application for reissue filed March 14, 1910. Serial No. 549,375.

*To all whom it may concern:*

Be it known that I, HENRY F. BECHMAN, of Battle Creek, in the county of Calhoun and State of Michigan, have invented certain new and useful Improvements in Rotary Presses, (Double Line;) and I hereby declare that the following is a full, clear, and exact description thereof, reference being had to the accompanying drawings, which form part of this specification.

This invention is an improvement in rotary cylinder web printing presses, particularly designed for high speed presses of large capacity; and its objects are to provide a press in which newspapers of any number of pages, up to the limit of the press, can be printed in multiples of twos, without any reduction of speed; to do away with the collecting of papers; to lessen the number of plates required in such press; and to use what I term "single-plate" cylinders,—of half the diameter of the plate cylinders ordinarily employed,—and tubular stereotype plates that fit these small cylinders, instead of the semi-circular plates ordinarily employed.

In ordinary rotary presses heretofore used the plate cylinders are of such diameter as to accommodate two stereotype plates around the circumference thereof, said plates being ordinarily applied at diametrically opposite sides of the cylinder,—that is, the circumference of the cylinder must be more than twice the length of one page of paper, and it is necessary in printing with such cylinders to make duplicate stereotype plates, unless the pages are to be collected; and when duplicate plates are not used the pages must be collected, and therefore while the size of the papers may be thus increased, the speed of their production is reduced one-half. I avoid the use of duplicate plates as required in straight run old style machines, and I also avoid the necessity of collecting the pages; and produce the papers as rapidly as they could heretofore be produced with duplicate sets of plates, and run the small plate cylinders at the same peripheral speed as the old style duplicate plate cylinder presses could be run,—but require only half the number of plates to produce the papers as are required in the old style press, while obtaining the same speed and product.

Preferably I construct the press with the single plate cylinders only two pages long, that is—they will accommodate but two tubular plates arranged end to end on each cylinder,—and each perfecting mechanism will therefore produce four pages, and the press illustrated in the drawings having four sets of such perfecting mechanisms, I can produce as much as sixteen newspaper pages at each operation of the machine. By employing longer plate cylinders to carry three or more tubular plates each, the capacity of the press can be correspondingly increased. The press moreover is adapted to produce a less number of pages in multicolor, as hereinafter explained.

I will now describe the invention as embodied in the press illustrated in the accompanying drawings,—and refer to the claims for summaries of the novel features and combinations of parts embraced in the invention and for which protection is desired.

In the drawings—Figure 1 is a side elevation of the complete press. Fig. 2 is a top plan view thereof. Fig. 3 is a longitudinal sectional elevation of the press showing one mode of threading it for single color work. Fig. 4 is a similar view showing one mode of threading the press for multicolor work. Fig. 5 is a detail sectional view showing one of the tubular plates (stereotyped) applied to a cylinder.

A, B, C and D, designate four perfecting printing mechanisms, all of which are constructed substantially alike, and each comprises two plate cylinders 1, $1^a$, and two intermediate co-acting impression cylinders 2, $2^a$. Preferably these cylinders are all disposed transversely of the press, and the plate cylinders 1, $1^a$ are of but half the diameter of the ordinary plate cylinders, and of the impression cylinders 2, $2^a$, which impression cylinders are of the usual diameter employed with the ordinary large sized or double plate-cylinders. The plate cylinders 1, $1^a$, are but slightly greater in circumferential extent than the length of one page of type and therefore are adapted to carry one page plates P of tubular form which plates substantially surround the circumference of the plate cylinder as indicated in Fig. 5 and can be slipped endwise on or off the cylinder. At each rotation of the impression cylinder the entire tubular plate surface is presented to the paper.

Only one tubular plate has to be provided for each page. As each plate cylinder carries two such plates obviously each perfecting mechanism will print four pages, and the product of all four sets of perfecting mechanisms will be sixteen pages.

As shown in Fig. 3, a separate web is led through each printing mechanism so that the sixteen pages can be printed in one color and assembled at the folder former F. In this figure the web $w'$ is led in over guides $a'$, $a^2$, down to and between cylinders 1 and 2, in section A, then between cylinders 2 and $2^a$, then between $2^a$ and $1^a$, by which it is perfected, then down and under guides $a^3$, $a^4$, and up and over guide $a^5$ to the former F. A web $w^2$ may be led in over guides $b'$, $b^2$ and between the plate and impression cylinders in section B, by which it is perfected, and thence down under guide $b^3$, around guide $b^4$, and up and over guide $b^5$ to the former F. A web $w^3$, may be led in over guides $c'$, $c^2$ to the perfecting mechanism C, whereby it is perfected and then passed down under guide $c^3$, around guide $c^4$, and up and over guide $c^5$ to the former F. And the fourth web $w^4$ may be led in over guides $d'$, $d^2$ to the perfecting mechanism D, and led thence down and under guide $d^3$, over and around guide $d^4$, and up and over guide $d^5$ to the former F, the webs being all assembled together at the former and thereafter folded in the usual manner. Each web goes directly through the press without being turned or deflected laterally at any time and thus the webs can be printed and traveled with great rapidity.

The same mechanism may be used to print one or more webs in multi-colors if desired. Thus, as illustrated in Fig. 4, the web $w'$ after passing through perfecting mechanism A, is led directly from cylinder $2^a$ to and between the cylinders 1 and 2, of perfecting mechanism C, and after passing through said perfecting mechanism it is led down and under guide $c^3$, over and around guide $c^4$, and up and over guide $c^5$ to the former F. While web $w^2$ after passing through perfecting mechanism B, is led direct to and through the perfecting mechanism D, and thence passes down and under guide $d^3$, over and around guide $d^4$, and up and over guide $b^5$, to the former F. The web $w'$ may receive impressions in one color in A, and another color in C; and similarly the web $w^2$ may receive impressions in one color in B and another color in D. Other modes of threading the webs through the press may be employed.

Suitable inking mechanisms are provided for each plate cylinder as indicated at 3 in the drawings, but need no detailed description herein.

As shown, the press has two tiers of perfecting mechanisms, each tier comprising two perfecting mechanisms arranged in substantially the same plane, with the cylinders in the same plane and lying transversely of the press. Obviously the capacity of the press can be increased to any desired extent by increasing the length of the printing cylinders in each perfecting mechanism; or by adding additional tiers of perfecting mechanisms; or by increasing the number of perfecting mechanisms in each tier. The press thus constructed—owing to the small diameter of the plate cylinders—is more compact than presses employing the old double plate cylinders, and is less expensive to operate because of the greatly reduced number of plates required for a given speed and size of paper.

Having described my invention what I claim as new and desire to secure by Letters Patent is:

1. In a printing press, the combination of a plurality of printing mechanisms each comprising two plate and two impression cylinders, the plate cylinders being half the diameter of the impression cylinders, and adapted to carry a plurality of single page tubular plates arranged end to end each page plate extending around the circumference of the cylinder, for the purpose described.

2. In a printing press, the combination of a plurality of perfecting mechanisms, each comprising two plate and two impression cylinders, the plate cylinders being of small diameter and slightly greater in circumference than the length of a single page and adapted to carry single page tubular plates arranged end to end, each page plate extending around the circumference of the cylinder.

3. In a newspaper printing press the combination of perfecting mechanism comprising two plate and two impression cylinders, the plate cylinders being half the diameter of the impression cylinders, and adapted to carry a plurality of single page tubular plates arranged end to end, each page plate extending around the circumference of the cylinder, and all the cylinders being arranged substantially in the same horizontal plane and guides for directing a web through said perfecting mechanism.

4. In a printing press the combination of a plurality of perfecting mechanisms—each comprising two plate and two impression cylinders, the plate cylinders being of small diameter and slightly greater in circumference than the length of a single page and adapted to carry a plurality of single page tubular plates arranged end to end, each page plate extending around the circumference of the cylinder, all the plate and impression cylinders being arranged substantially in the same horizontal plane, with guides for directing webs through said perfecting mechanisms, substantially as described.

5. In a newspaper printing press, the combination of two superposed perfecting mechanisms each comprising two plate and two impression cylinders, one perfecting mechanism being arranged above the other, the plate cylinders being of small diameter and slightly greater in circumference than the length of a single page and adapted to carry only single page tubular plates, each page plate extending around the circumference of the cylinder.

6. In a printing press, the combination of two superposed perfecting mechanisms each comprising two plate and two impression cylinders arranged in substantially the same plane and extending transversely of the press, one perfecting mechanism being arranged above the other, said plate cylinders being of small diameter and slightly greater in circumference than the length of a single page and adapted to carry only single page tubular plates, each page plate extending around the circumference of the cylinder.

7. In a newspaper printing press, the combination of two superposed perfecting mechanisms each comprising two plate and two impression cylinders, one perfecting mechanism being arranged above the other; the plate cylinders being of small diameter and adapted to carry single page tubular plates each page plate extending around the circumference of the cylinder, which is slightly greater than the length of a single page, a former at the end of the press, and web guides for directing a web or webs through one or both of the perfecting mechanisms and straight to the former.

8. In a printing press the combination of two superposed perfecting mechanisms each comprising two plate and two impression cylinders, arranged in substantially the same plane and extending transversely of the press, one perfecting mechanism being arranged above the other, said plate cylinders being of small diameter and slightly greater in circumference than the length of a single page and adapted to carry a plurality of single page tubular plates arranged end to end, each page plate extending around the circumference of the cylinder, with a folder at the end of the press, and web guides for directing a web or webs through one or both of the perfecting mechanisms and straight to the former.

9. In a printing press the combination of a plurality of tiers of printing mechanisms, superimposed one above the other, each tier containing a plurality of perfecting mechanisms arranged in substantially the same plane, each perfecting mechanism comprising two plate and two impression cylinders, the plate cylinders being of half the diameter of the impression cylinders and adapted to carry a plurality of single page tubular plates, each page plate extending around the circumference of the cylinder.

10. In a printing press the combination of a plurality of tiers of printing mechanisms, superimposed one above the other, each tier containing a plurality of printing mechanisms, each comprising two plate and two impression cylinders, the plate cylinders being half the diameter of the impression cylinders and adapted to carry a plurality of single page tubular plates, each page plate extending around the circumference of the cylinder; with a folder and guides for directing webs through the printing mechanisms to the folder.

11. In a printing press the combination of a plurality of tiers of printing mechanisms, superimposed one above the other, each tier containing a plurality of perfecting mechanisms arranged in substantially the same plane, each perfecting mechanism comprising two plate and two impression cylinders, the plate cylinders being of half the diameter of the impression cylinders and adapted to carry single page tubular plates; each page plate extending around the circumference of the cylinder; with a folder at one end of the press, guides for directing a web through each perfecting mechanism to the folder without lateral deflection of the web, and whereby one or more webs can be directed successively through one or more of the perfecting mechanisms.

12. In a printing press the combination of a plurality of tiers of printing mechanisms arranged one over the other, each tier containing a plurality of printing mechanisms, each mechanism comprising two plate and two impression cylinders arranged in substantially the same plane, the plate cylinders being half the diameter of the impression cylinders, and adapted to carry a plurality of single page tubular plates arranged end to end, each page plate extending around the circumference of the cylinder; a former at one end of the press and means for directing a web or webs through the mechanisms in a direct line to the former without lateral deflection of the webs.

13. In a printing press wherein one or more webs may be printed in one or more colors, the combination of a plurality of tiers of perfecting printing mechanisms arranged one over the other, each tier containing a plurality of perfecting mechanisms, each perfecting mechanism comprising two plate and two impression cylinders arranged in substantially the same plane but transversely of the press, the plate cylinders being half the diameter of the impression cylinders, and adapted to carry single page tubular plates arranged end to end, each page plate extending around the circumference of the cylinder; a former at one end of the press and guides for directing a web or webs through the perfecting mechanisms in a direct line to the former without lateral deflection of the webs.

14. In a printing press, the combination of two sets of rotary perfecting mechanisms, arranged one above the other in parallel planes, each comprising two plate and two impression cylinders, the plate cylinders being of half the diameter of the impression cylinders and adapted to carry a plurality of single page tubular-plates arranged end to end, each page plate extending substantially around the circumference of the cylinder, gearing between the sets of cylinders, and web guiding mechanism whereby a web or webs may be directed independently or successively through the perfecting mechanisms.

15. In a newspaper printing press a printing mechanism comprising a plate cylinder, and an impression cylinder, the plate cylinder being adapted to carry tubular plates, each plate being of one page extending around the circumference of the cylinder, substantially as described.

16. In a newspaper printing press a printing mechanism comprising a plate cylinder and an impression cylinder, the plate cylinder being adapted to carry tubular plates, each plate corresponding in superficial area to one page of type matter curved to surround the plate cylinder and to produce successive impressions on the web.

17. In a printing press, the combination of a plurality of printing mechanisms, each comprising two plate cylinders and two impression cylinders, each plate cylinder being adapted to carry single page tubular plates, each plate extending around the circumference of the cylinder.

18. In a printing press, the combination of a plurality of printing mechanisms, each comprising plate cylinders and impression cylinders, each plate cylinder being adapted to carry single page tubular plates, each plate containing but one page of type matter curved to surround the plate cylinder and to produce successive impressions on the web.

19. In a printing press, a perfecting mechanism comprising two plate cylinders and two impression cylinders, the plate cylinders being of comparatively small diameter and adapted to carry tubular plates, each plate extending around the circumference of the cylinder, and the circumference of the plate cylinder being substantially equal to the length of page or sheet to be printed.

20. In a newspaper printing press a printing mechanism comprising a plate cylinder and an impression cylinder, the plate cylinder being adapted to carry tubular plates, each plate corresponding in superficial area to one page of type matter, and curved to surround the plate cylinder and to produce successive impressions on the web separated only by the necessary margins.

21. In a newspaper printing press a printing mechanism comprising a plate cylinder and an impression cylinder, the plate cylinder being adapted to carry one page tubular plates, each plate containing but one newspaper page of type matter and extending around the circumference of the cylinder and adapted to print successive similar page-impressions on the web separated only by the necessary margins, substantially as described.

22. In a printing press, the combination of a plurality of printing mechanisms, each comprising a plate cylinder and an impression cylinder, the plate cylinder being adapted to carry single page tubular plates, each plate containing but one page of type matter, like the usual semi-cylindrical stereotype plates, but curved to surround the plate cylinder and to produce successive similar page-impressions on the web separated only by the necessary margins.

23. In a printing press, a perfecting mechanism, comprising two plate and two impression cylinders, the plate cylinders being of small diameter as compared with the usual plate cylinders and adapted to carry tubular plates of correspondingly small diameter; with tubular plates each containing a single newspaper page of type matter and extending around the circumference of the cylinder, and the circumference of each plate cylinder being substantially equal to the length of one page of type matter plus the margins between successive impressions.

In testimony that I claim the foregoing as my own, I affix my signature in presence of two witnesses.

HENRY F. BECHMAN.

Witnesses:

IRVING K. STONE,

I. L. STONE.